United States Patent [19]
Smart

[11] 3,965,286
[45] June 22, 1976

[54] SPACER-DAMPER FOR OVERHEAD POWER TRANSMISSION LINES

[75] Inventor: Thomas John Smart, Oadby, England

[73] Assignee: Dunlop Limited, London, England

[22] Filed: Apr. 15, 1975

[21] Appl. No.: 568,318

[30] Foreign Application Priority Data
Apr. 18, 1974 United Kingdom............... 16962/74

[52] U.S. Cl.................................. 174/42; 174/146
[51] Int. Cl.[2]...................... H02G 7/14; H02G 7/12
[58] Field of Search............................ 174/42, 146

[56] References Cited
UNITED STATES PATENTS
3,784,723   1/1974   Cantamessa.......................... 174/42

FOREIGN PATENTS OR APPLICATIONS
1,084,102   9/1967   United Kingdom................. 174/146
1,220,084   1/1971   United Kingdom................. 174/42

Primary Examiner—Laramie E. Askin
Attorney, Agent, or Firm—Stevens, Davis, Miller & Mosher

[57] ABSTRACT

A spacer-damper for a sub-conductor bundle of two or more sub-conductors of an overhead power transmission line comprising an arm for each sub-conductor, each arm having provided at one end a clamp for attachment to a sub-conductor and at the other end a resilient connection connecting said other end of the arm to a lever means extending between one arm end and another arm end wherein the lever means comprises at least two levers interconnected by resilient means to act in series between the connected arm ends whereby sub-conductor movement causes displacement of the resilient connections and of the resilient means.

7 Claims, 1 Drawing Figure

U.S. Patent June 22, 1976 3,965,286
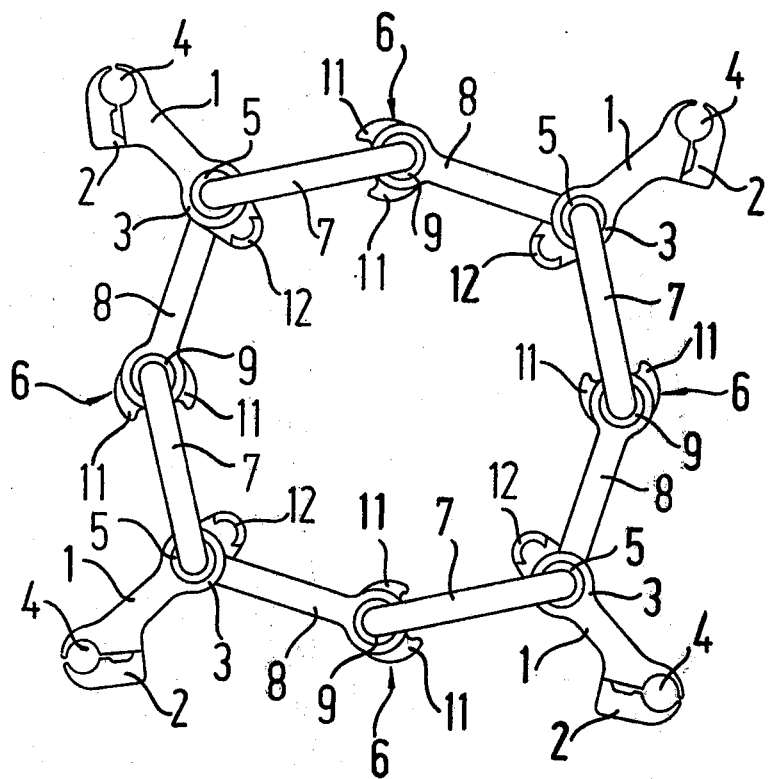

SPACER-DAMPER FOR OVERHEAD POWER TRANSMISSION LINES

This invention relates to spacer-dampers for overhead power transmission lines comprising two or more sub-conductors arranged in a group or bundle for each conductor pole.

Known spacer-dampers utilize a rigid central frame to which are pivotally connected clamp-arms, one for each subconductor. Movement of each clamp-arm relative to the frame is damped commonly by an elastomeric material member. Subconductors of a bundle have also been spaced apart by means of a flexible deformable metal cable connected to the subconductors by clamps; and while such a device provides limited damping, the deformation of the cable during conductor movement is unpredictable and generally unsatisfactory and is prone to collapse under short circuit loads.

It is one object of the present invention to provide a spacer-damper without a rigid frame which is constructed to damp efficiently sub-conductor movements and in particular all movements in a plane transverse to the sub-conductor axes.

According to one aspect of the present invention a spacer-damper for a sub-conductor bundle of two or more subconductors comprises an arm for each sub-conductor, each arm having provided at one end a clamp for attachment to a subconductor and at the other end a resilient connection connecting the said other end of the arm to a lever means extending between one arm end and another arm end, and wherein the lever means comprises at least two levers interconnected by resilient means to act in series between the connected arm ends whereby sub-conductor movement causes displacement of the resilient connections and of the resilient means.

The resilient connections and resilient means are preferably of elastomeric material and may be in the form of bushes of elastomeric material. The bushes are preferably arranged with their axes parallel to the axis of the subconductor bundle so that transverse sub-conductor movements impose a torsional and radial load on the material of the bushes. The bushes may be connected to each arm or lever by mechanical means, such as for example interengaging serrations, or may be bonded to the arms or levers either directly or through metal tubes which are mechanically retained in the arms or levers. Relative longitudinal movement of the sub-conductors is accommodated by conical bush deformation.

When used for a bundle of more than two subconductors, the spacer-damper includes more than one lever means and in such constructions two or in some cases three or more lever means may be connected to a single resilient connection. By example a four sub-conductor bundle conveniently utilizes four lever means arranged in a rectangle, two being connected to each resilient connection so that the arms extend one from either corner of the rectangle.

The elastomer chosen for the resilient member may be of any of those at present used in cable spacers. It may be generally a conducting material in order to prevent potential differences between the sub-conductor of each bundle.

Other aspects of the invention will be apparent from the following description, by way of example only, of one embodiment of the invention illustrated in the drawing which is for a four sub-conductor square bundle.

The spacer-damper illustrated has four arms 1, one for each sub-conductor. Each arm has a clamp 2 at one end and an enlarged end portion 3 at the other end. The clamps 2 are for attaching the arms 1 to the sub-conductors which are located in apertures 4 formed by the clamps 2.

In each enlarged end portion 3 is mounted a resilient connection in the form of a rubber bush 5 bonded into an aperture in the enlarged end portion 3.

A lever means 6 is provided between each adjacent pair of arms 1, the lever means being connected to each arm by means of the rubber bush 5. The lever means 6 comprises two separate rigid metal levers 7, 8 which are connected in series by means of a second resilient rubber bush 9. The rubber bush 9 is an interference fit in an aperture in an enlarged end portion provided at one end of the lever 8 and is bonded in its inner surface to the lever 7 so that relative angular displacement of the levers 7, 8 torsionally stresses the rubber bush 9. A pair of limit stops 11 are formed on the lever 8 which are arranged to contact the lever 7 to limit relative angular displacement to a value which does not damage the bush 9.

Each arm 1 has connected to it the ends of two lever means 6, one from each adjacent conductor, and the rubber bush 5 connects each of the lever means so that they may pivot on the arm independently. The elongated end 3 of each arm 1 has formed a projecting stop 12 which engages either lever means to prevent damaging displacement of the rubber bushes 5.

The rubber bushes 5, 9 allow relative movements of the arms in a plane transverse to the sub-conductor axes by means of torsional movement. The rubber resists this movement and provides force to restore the spacer-damper shape and thus the bundle shape. Furthermore the internal hysteresis losses within the rubber damps sub-conductor movements and as the arms are displaced generally at 45° to the vertical plane, horizontal (or sub-conductor) vibrations as well as vertical (or aeolian) vibrations are damped. Longitudinal sub-conductor movement is allowed by conical deformation of the rubber bushes.

The resilient bushes may be of any suitable elastomeric material and are conveniently made conducting to allow equalization of the voltage potential between the conductors. The bushes may be connected by means other than bonding and may be held in place by compressive forces or by means of mechanical interlocking, such as for example by means of complementary serrations on the bush and the arm and lever surfaces at the surfaces of interengagement.

Each lever means may comprise more than two levers inter-connected by resilient members. Furthermore the lever members can connect the arms in any pattern and the octagonal pattern disclosed is only one such arrangement.

Arm angles other than 45° to the vertical plane may be used and indeed sub-conductor movement in any transverse direction can be accommodated even with horizontal or vertical arm disposition because of the action of the lever means.

Many different bundle configurations may be provided for by means of a given set of arms and lever means, by means of adding further lever means and arms as necessary to assemble a sufficiently large spacer-damper having the required number of arms.

The resilient spacer-damper is therefore economic to manufacture and utilizes no large central frame. The stops provided prevent bush damage by limiting arm and lever movement under abnormal conditions such as a short-circuit fault or unequal ice loading of conductors.

Having now described my invention, what I claim is:

1. A spacer-damper for a sub-conductor bundle of at least four sub-conductors of an overhead power transmission line, comprising: an arm for each sub-conductor, each arm having at one end a clamp having a groove for engaging the sub-conductor and at the other end a first resilient pivotal connection; and a central ring of at least eight rigid levers connected in series by second resilient pivotal connections, the first resilient pivotal connection at said other end of each arm connecting said arm to the central ring such that at least three resilient pivotal connections are in series between each adjacent pair or arms and all said pivotal resilient connections have their axes parallel to the axes of the grooves in the clamps.

2. A spacer-damper according to claim 1 wherein the resilient connections comprise elastomeric material.

3. A spacer-damper according to claim 2 wherein the elastomeric material is in the form of a cylindrical bush.

4. A spacer-damper according to claim 3 wherein the cylindrical bushes are arranged with their axes parallel to the axes of the grooves in the clamps so that sub-conductor movements perpendicular to the axes impose torsional and/or radial loads on the material of the bushes.

5. A spacer-damper according to claim 4 wherein the bushes are connected to the arms or levers by bonding.

6. A spacer-damper according to claim 5 wherein the bushes are bonded to metal tubes which are mechanically retained in the arms and levers.

7. A spacer-damper according to claim 6 wherein limit stops are provided at the resilient connections to prevent excessive movement of the connections.

* * * * *